Aug. 20, 1940.                J. B. WALKER                2,211,995
                          PHOTOGRAPHIC CAMERA
                           Filed Dec. 5, 1938
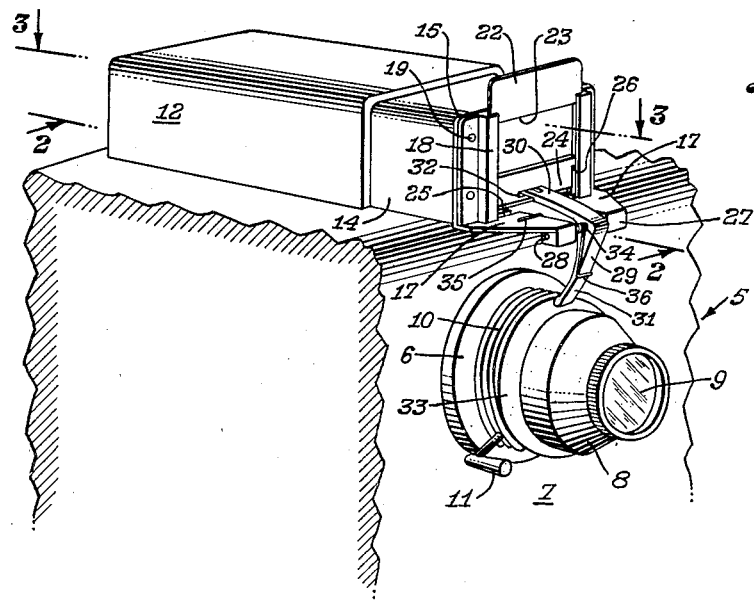
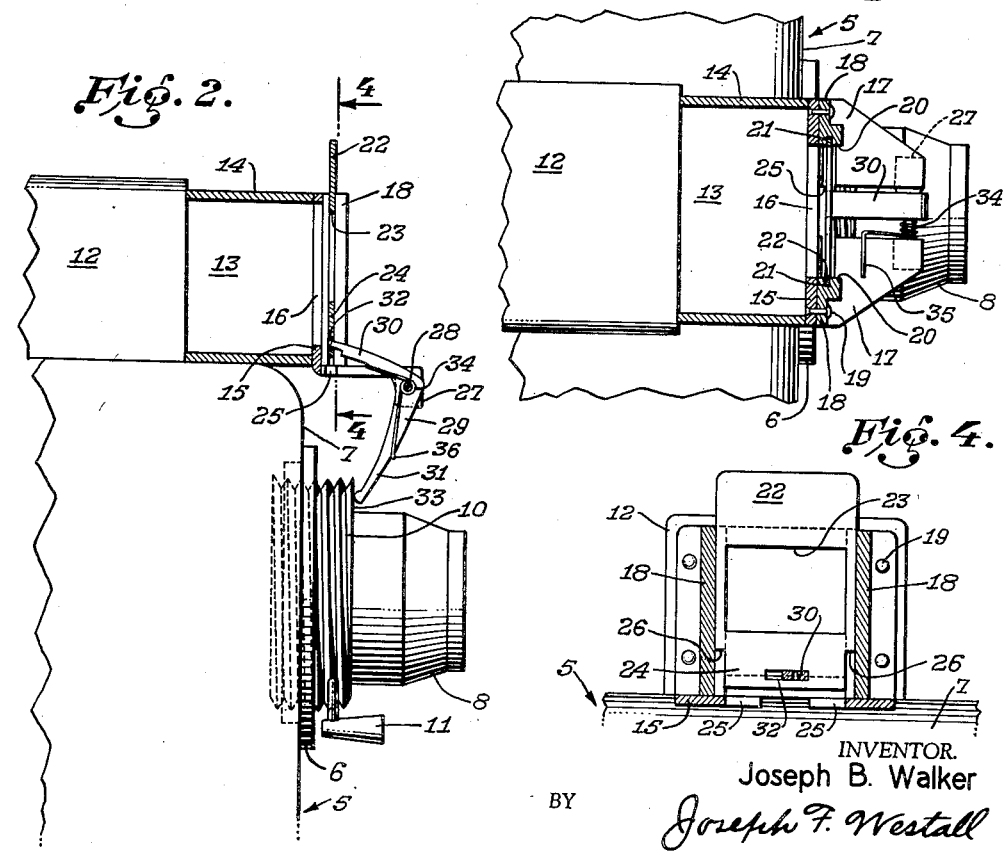
INVENTOR.
Joseph B. Walker
BY Joseph F. Westall
ATTORNEY.

Patented Aug. 20, 1940

2,211,995

UNITED STATES PATENT OFFICE 2,211,995

PHOTOGRAPHIC CAMERA

Joseph B. Walker, Los Angeles, Calif.

Application December 5, 1938, Serial No. 244,062

4 Claims. (Cl. 95—44)

This invention relates to photographic cameras, and contemplates a simple mechanism for changing the angle between the optical axis of the view finder and the axis of the photographic lens to correspond with the distance between the camera and scene to be photographed.

Heretofore in the art in order to compensate for the parallax between the view finder and photographic lenses of a camera, provision was made for tilting the finder, to enable extensions of the axes of the photographic and finder lenses to converge on the object focused.

It is a general object of the present invention to provide apparatus for effecting the same result as the aforementioned well known expedients, but which embodies greater simplicity and economy of construction, and further, permits of a wider range of adjustment to minimize the effect of mechanical inaccuracies.

Another and more specific object is to provide a mask mounted vertically movable on the finder at right angles to the line of collimation to vary the angle between the optical axis of the finder and the photographic lens assembly and thereby compensate for the parallax.

Another object is the provision of a frame comprising a support for a movable mask adapted for installation on the projecting lens mounting of conventional type camera view-finders.

Another object is to provide mechanism in a device of the character indicated for controlling the vertical adjustment of the mask, which is actuated automatically by the focusing adjustment of the photographic lenses whereby the position of the mask with respect to the finder lens axis will maintain an angle between the optical axis of the finder and axis of the photographic lens assembly having a center on the object focused by the photographic lenses.

Other objects and salient features of my invention such as ease of operation, positive determination of the picture field, and simplicity in the controlling mechanism, will be apparent to those of skill in the art from an examination of the following description read in the light of the accompanying drawing, in which:

Fig. 1 is a perspective view of a camera case and view finder partially broken away with my invention in operative position thereon;

Figs. 2 and 3 are sectional views taken on correspondingly numbered lines of Fig. 1;

Fig. 4 is a section taken on lines 4—4 of Fig. 2.

Referring to the drawing in detail, the numerals of which indicate similar parts throughout the several views, 5 designates generally a camera case of conventional construction having a lens mounting 6 integral with the forward side 7 of the case. A lens carrier 8 is reciprocably supported within the mounting 6 for the support of one or more photographic lenses 9. The lenses are focused by means of a member 10 integral with the lens carrier and threaded into the mounting 6, and which, upon rotation, reciprocates the lens carrier 8 in a direction coaxial with the lens 9. 11 indicates a crank secured to the periphery of the focusing member by which said member is rotated to facilitate the focusing adjustment just noted. The usual view finder 12 is integrally mounted on top of the camera case having a positive lens (not shown) which is axially parallel with the axis of the photographic lenses 9. The forward rectangular end of the view finder is diametrically reduced and provides a mounting 13 for the objective negative lens of the finder (not shown). The construction of the camera and finder forms no part of the present invention, being generally described merely to afford a better understanding of the application of the attachment comprising my invention.

In order to correct the parallax inherent in a camera of the type above alluded to, I provide a frame 14, rectangular in cross-section and corresponding in proportion to the projecting lens mounting 13 over which the frame 14 slidably and removably telescopes.

A plate 15 is sweated to the forward end of the frame and is formed with a rectangular opening 16. A pair of supporting members 17—17 extend at right angles from the opposite sides of the lower end of the plate with which they are integral. The members 17—17 are spaced apart for a purpose later referred to. On each forward face of the vertical sides of the plate, a guide member 18 is secured by rivets 19 or the like. The guide members at opposite sides of the opening 16 are spaced apart a distance corresponding to the width of the opening so as not to restrict the same. The opposed faces 20 of each guide member 18 are longitudinally grooved in a vertical plane parallel to the focal plane of the finder lens as at 21.

A mask comprising a panel 22 of suitable material, having a rectangular light aperture 23 therein registering with, but smaller than, the opening 16 in plate 15, is slidably carried by the engagement of its sides in grooves 21 of the guide members 18. The dimensions of the aperture 23 are preferably proportionate and commensurate with the field of a photographic image to thereby mask out any portion of the field of the finder lenses not included by the image registered on the film through the photographic lens system of the camera.

The lower end of the mask panel 22 is formed with an integral extension 24 of a width less than the upper portion of the panel in which aperture 23 is located. The extension 24 is adapted to slide through aligned slots 25 transversely formed in the adjacent sides of the supporting members 17—17, but the difference in diameter of the panel and its lower extension forms downwardly directed shoulders 26 which are adapted to abut against supporting members 17—17 to limit downward sliding movement of the mask in the grooves 21.

The outer ends of the horizontal supporting members 17—17 of the plate are turned under upon themselves to form bearings 27 for the opposite ends of a pin 28. Pin 28 extends through the vertex of the angle of an L-shaped lever 29 comprising upper and lower arms 30 and 31, respectively, thus providing a fulcrum for the lever. A horizontal slot 32 is formed in the lower extension 24 of the mask into which the outer end of arm 30 of lever 29 extends. The lower end of the other arm 31 of lever 29 bears against the outer annular face 33 of member 10. One end of a spring 34 coiled around the pin engages the upper face of one of the horizontal supporting members of the plate as at 35 and its opposite end engages the forward surface of the lower arm 31 of the lever as at 36 to resiliently maintain the lower end of arm 31 against the face 33 of member 10.

The operation of the device is briefly described as follows: The focusing adjustment of the photographic lens by rotation of the member 10 will result in the face 33 of the member forcing the arm 31 outwardly or permitting it to move toward the camera case in response to the urge of spring 34, thus causing the arm 30 of lever 29 to swing on pin 28 either upwardly or downwardly, depending upon the direction of rotation of the focusing member 10 and thereby vary the position of the mask within the limits of its vertical movement. As the image formed on the object glass of the finder will be determined by the light admitted through the light aperture of the mask, the center of the image will coincide with the center of the mask aperture. Consequently, the raising and lowering of the mask will change the field of view to correspond with the view focused by the photographic lens system. It will be understood that the initial position of the mask and the angle of the cam face will be constructed in accordance with the focal length of the photographic lenses of the camera in order that the optical axis of the finder, as determined by the mask, will be always directed to the focus of the photographic lens. Thus, when the photographic lens is to be focused on an object near the camera, rotation of member 10 incident to bringing the object into focus will result in movement of the arm 31 of lever 29 outwardly so as to bring the arm 30 of the lever into a more nearly horizontal position and simultaneously lowering the mask whereby the optical axis of the finder and axis of the photographic lenses will converge on the point of focus of the latter lens.

It will be understood that the specific mechanism above described for effecting movement of the mask in the manner corresponding with the focusing adjustment of the photographic lenses is only illustrative of the various embodiments of which my invention is susceptible, and that numerous changes in size, design, shape, and proportion of the parts may be necessary to adapt the attachment to the various conventional types of cameras now in general use, as, for example, while I have shown a frame rectangular in cross-section to telescope the forward end of the usual view finder, any means for supporting the mask at a substantially right angle to the axis of the lens may be substituted, and further, that the mask may be disposed within the finder itself either in back or in front of the finder lens, all without departing from the spirit of my invention as defined by the appended claims.

What I claim and desire to secure by Letters Patent is:

1. In a camera, a camera box, a finder lens system comprising a lens mounting secured to said box, a frame slidably carried by said lens mounting for axial adjustment relative thereto, guide rails connected to and transverse to the axis of said frame, a mask slidable between said rails, a fulcrum carried by said frame in front of said mask, a photographic lens mounting carried by said box for axial movement with respect to the box, an angular actuating arm pivoted on the axis of said fulcrum, one portion of said arm engaging said mask and a second portion of said arm engaging said photographic lens mounting, said mask being movable between said rails by movement of the said second portion of the arm in a direction at substantially right angles to the mask in response to axial adjustment of the photographic lens mounting.

2. In a camera, a camera box, a finder system comprising a lens mount, an auxiliary parallax correcting device comprising a frame having aligned light openings therein forming a light passage therethrough, means for attaching said frame on said lens mount, a mask slidably mounted on said frame for movement transverse to the axis of the frame to control the direction of light rays passing through said frame, a lever pivoted to said frame having one end thereof engaging said mask to position the latter, and a photographic lens mounting carried by the camera box movable in a direction substantially parallel to the light passage to actuate said lever.

3. In a device of the character described, a camera box, a finder lens mounting carried by said box, an auxiliary parallax correcting attachment comprising a mask, a frame forming a light passage therethrough, means for attaching said frame to said finder lens mounting, guide rails carried by said frame at right angles to said light passage for the sliding movement of said mask, a pair of projecting arms connected to said frame and extending forwardly of said mask, a fulcrum carried by said arms at right angles to the direction of movement of the mask, an angular arm pivoted at the vertex of its angle on said fulcrum, and having a portion thereof forming one side of the angle of the arm pivotally connected to the mask, a photographic lens mounting carried by the camera box for axial movement with respect to said frame, the opposite end of said arm engaging said photographic lens mounting and movable by the latter to swing said first-named portion of said arm in a vertical arc and thereby slide said mask with respect to said frame.

4. In a device of the character described, a camera box having a finder lens mounting attached thereto, a finder attachment comprising a box-like frame connected to said finder lens mounting, a mask slidably carried by said frame for movement transverse to the axis of the finder lens mounting, said frame having a projection extending in front of the mask, a photographic lens mounting carried by said camera box and movable axially with respect to said box, and an angular arm pivoted to said projection having one end thereof engaging said mask and its opposite end engaging said photographic lens mounting, said arm being actuated by said photographic lens mounting to reciprocate said mask.

JOSEPH B. WALKER.